J. W. GRAY.
Water-Wheel.
No. 210,023. Patented Nov. 19, 1878.
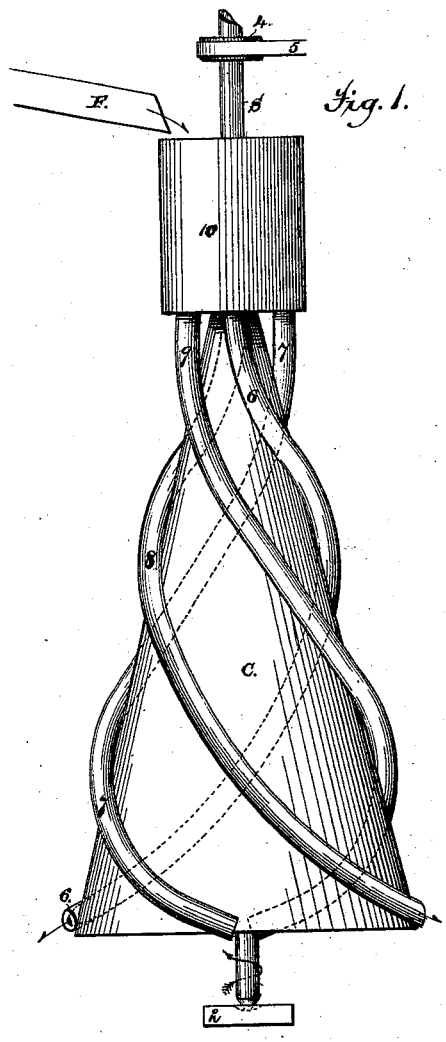
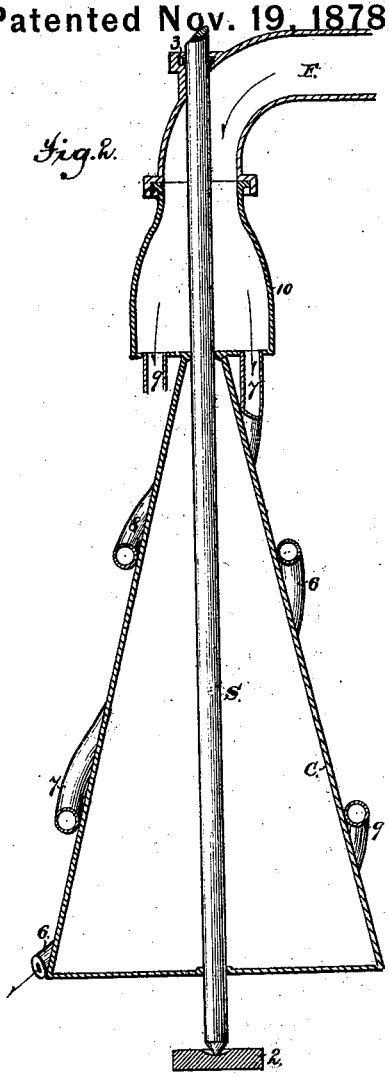
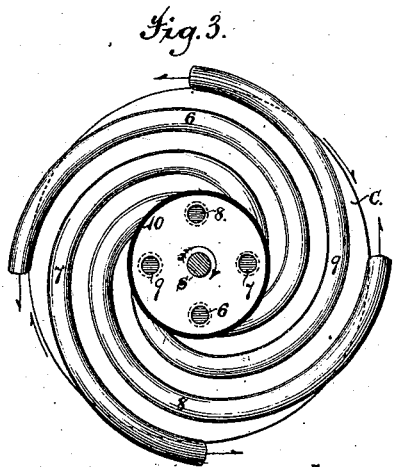
Attest,
Geo. H. Graham.
Wm. C. Hespe
Inventor,
Joshua W. Gray,
by Munson & Philipp
Attorneys.

UNITED STATES PATENT OFFICE.

JOSHUA W. GRAY, OF GHENT, NEW YORK.

IMPROVEMENT IN WATER-WHEELS.

Specification forming part of Letters Patent No. 210,023, dated November 19, 1878; application filed September 6, 1878.

*To all whom it may concern:*

Be it known that I, JOSHUA W. GRAY, of Ghent, county of Columbia, and State of New York, have invented certain new and useful Improvements in Water-Wheels; and I do hereby declare that the following specification, taken in connection with the accompanying drawings, is such a full, clear, and exact description of the same as will enable others skilled in the art to make and use the same.

In said drawings, Figure 1 is a side elevation of a water-wheel constructed according to my invention. Fig. 2 is a sectional elevation thereof, with the induction-head modified so as to be attached to the water-flume; and Fig. 3 is a top or plan view of Fig. 1.

The object of this invention is the production of a water-wheel whereby the maximum power which may be derived from a given quantity of water is obtained; and said invention consists in a peculiar construction of the wheel, which adapts it to receive rotary motion from the weight, impulse, and reaction of the body of water directed to it. Thus the three sources of deriving power from a body of water are utilized in effecting the rotative movements of said wheel, all of which will be more particularly hereinafter set forth.

In order to a ready understanding of the invention, the structure of the wheel illustrated by the drawing will first be explained, and then its modifications and mode of operation will be described.

It belongs to the class of horizontal wheels having a vertical axis or spindle, S, journaled below in a step, 2, and above in a bearing or box, as 3, supported by any suitable frame, and transmitting rotary motion by means of a pulley, 4, and belt 5, or other common gearing. To this spindle S is affixed, near its upper end, a hollow water-receiving head, 10, from the bottom of which depend the pipes 6 7 8 9. These pipes communicate with the interior of the head 10, as seen in Fig. 2, and depend therefrom in volute form—that is to say, they form a spiral, which gradually expands from the upper to the lower end of each pipe, the said pipes, according to the number used, forming a nest, the several pipes constituting which are fixed equidistant from each other at all points from their upper to their lower ends. They may be supported in proper position, and braced so as to resist any strain to which they may be subjected, by means of a central support, consisting of a sheet-metal or other cone, C, which, secured firmly to the spindle S, affords a body to which the pipes may be secured; but the pipes may be held in place by means of brace-rods extending from the spindle S or from pipe to pipe, as is obvious.

The induction-orifices at the upper ends of the pipes are of the full size of the interior of said pipes, while the eduction-orifices at their lower ends are somewhat contracted, so as to cause the water to react in said pipes.

The water-receiving head 10 may have its upper end open and receive the water from a flume, F, as in Fig. 1; or it may be contracted and attached to said flume by means of a stuffing-box, as in Fig. 2.

The number of these pipes necessary to constitute a working wheel is not limited, since one or any other number will work effectively. Their length, the pitch of the spiral figure they form, and the amount of contraction of their eduction-orifices are no wise limited, as one or all of these dimensions may be changed, according to the necessities of individual cases, or as experience may suggest, without departing from the scope of my invention.

The operation of the wheel is as follows: A quantity of water caused to flow into the receiving-head 10 at the top of the wheel will descend through the pipes 6 7 8 9, and be discharged at their eduction-orifices at the bottom of the wheel. The columns of water, by their weight and the force of their impulse upon the inclined walls of the pipes as they descend through the same, act with a tendency to straighten the pipes; but as this cannot be effected, said pipes are caused to take up a rotative movement, as will be readily understood, which is imparted to the spindle S; and as the free efflux of the columns of water is prevented by the contracted eduction-orifices of said pipes, the well-known effect of reaction is caused, whereby an additional rotative impulse is imparted to the pipes 6 7 8 9. The wheel is thus caused to rotate upon its axis with a velocity nearly equal to that of its effluent water, while the power exerted is proportionate to the weight of the vertical columns of water, and the velocity of their movement and the force of their reaction are due to the diminished size of their eduction-orifices. With a given body of water, a wheel thus formed is capable of exerting a greater amount of power than is attainable by water-wheels as commonly constructed.

The water may be discharged from the eduction-orifices of the pipes against the air; or the ends of said pipes may be immersed, so as to discharge against a body of water; or my improved wheel may be arranged above another wheel, so that the water expended in driving the first wheel may act to drive the auxiliary wheel, the motion thus imparted to which may be communicated to the first wheel by any suitable gearing.

What I claim is—

The combination, with the receiving-head 10, pipes 6 7 8 9, and spindle S, of the supporting-cone C, substantially as described.

In testimony whereof I have signed my name to this specification in the presence of two subscribing witnesses.

JOSHUA W. GRAY.

Witnesses:
F. MESICK,
S. M. WINN.